US006911250B2

(12) United States Patent
Ogura

(10) Patent No.: US 6,911,250 B2
(45) Date of Patent: Jun. 28, 2005

(54) TRANSFER PAPER FOR ELECTROPHOTOGRAPHY AND MANUFACTURING METHOD THEREOF

(75) Inventor: Motohiro Ogura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 10/269,981

(22) Filed: Oct. 15, 2002

(65) Prior Publication Data

US 2003/0082342 A1 May 1, 2003

(30) Foreign Application Priority Data

Oct. 22, 2001 (JP) ....................................... 2001-323976

(51) Int. Cl.[7] .......................... B32B 29/00; G03G 13/14

(52) U.S. Cl. .................... 428/211.1; 427/258; 427/286; 428/195.1; 428/219; 430/124; 430/126

(58) Field of Search ........................... 428/211.1, 195.1, 428/219; 427/258, 286; 430/124, 126

(56) References Cited

U.S. PATENT DOCUMENTS 4,778,711 A 10/1988 Hosomura et al. ....... 428/211.1
6,174,401 B1 1/2001 Ogura ........................ 156/235

FOREIGN PATENT DOCUMENTS

EP 0 621 510 A1 10/1994
EP 0 743562 A2 11/1996
EP 0 764 888 A2 3/1997
JP 62-193876 8/1987
JP 5-82940 4/1993

*Primary Examiner*—Pamela R. Schwartz
(74) *Attorney, Agent, or Firm*—Fitzpatrick, Cella, Harper & Scinto

(57) ABSTRACT

The present invention has an object to provide transfer paper for electrophotography which is excellent in paper-feed conveyability and image quality. The invention provides transfer paper for electrophotography having coated layers on both sides of a substrate material, comprising a first coated layer, containing a print seam, provided on at least one side thereof and a second coated layer provided on said first coated layer and having a print seam different from that of the first coated layer; wherein the total weight of the transfer paper for electrophotography is within a range from 60 to 130 g/m$^2$. The manufacturing method of the transfer paper for electrophotography according to the present invention comprises a first coating step for coating a first coated layer having a print seam on at least one of the sides; a drying step for drying the first coated layer formed in the first coating step; and a second coating step for coating a second coated layer having a print seam different from the first print seam, over the dried first coated layer; wherein the transfer paper for electrophotography has a total weight within a range of from 60 to 130 g/m$^2$.

6 Claims, 3 Drawing Sheets

TRANSFER PAPER FOR ELECTROPHOTOGRAPHY AND MANUFACTURING METHOD THEREOF

BACKGROUND OF THE INVENTION

1. Field of the Invention

The present invention relates to transfer paper for electrophotography having coated layers on both sides used in an electrophotographic device, an electrostatic recorder or the like, which ensures a high paper feedability and conveyability and provides a high image quality in electrophotography.

2. Description of the Related Art

In the area of electrophotography, digitalization of color recording devices has recently made a remarkable progress, and efforts have been made to achieve a higher image quality. Along with this tendency, in the sector of on-demand publishing, color copying machines and color printers are employed more and more popularly because of the possibility to more easily publish a smaller number of books for a title. These printed matters are now manufactured by means of copying machines and printers.

Coated paper used generally for printing, known as art paper or coated paper, has been used when forming a high-quality image. In the area of electrophotography as well, coated paper is now an indispensable item for achieving a high image quality. It has however been discovered that, when using such coated paper in electrophotography, heat pressurization through fixing rollers may sometimes cause blisters.

A blistering phenomenon is caused, because of the low air permeability of usual coated paper for printing, by peeling of the paper layers upon thermal expansion of steam contained in the paper. In this respect, Japanese Patent Publication No. 5-82940 proposes a transfer sheet of paper for dry-type electrophotography based on a process of forming a coated layer by coating a coating material comprising a bonding agent containing a pigment having an average particle size of 1.5 $\mu$m or smaller and high oil adsorptiveness on both sides of a base sheet of paper, then applying a smoothing treatment, and adjusting the center line average roughness of the coated layer surface to 2.0 $\mu$m or under and the air permeability to 4,000 seconds or under. In the case of usual coated paper, however, the air permeability is on a level of about 6,000 seconds. As a result, the proposed technique is not applicable to ordinary coated paper.

A problem intrinsic to coated paper is that, for the purpose of achieving smoothness of the surface, it is the usual practice to apply a smoothing treatment known as a calendar treatment in the final stage during formation of a coated layer on the paper. In this smoothing treatment, however, a problem of the paper becoming easier to break is encountered. This leads to the necessity to increase the weight. This prevented paper having a weight from 60 to 130 g/m$^2$ from being suitably employed for electrophotography. To solve this inconvenience, adoption of a method not applying an excessive pressure during formation of the coated layer was examined. Actually, it is tried to form a coated layer without decreasing stiffness of paper by use of a printer. When applying coating on such a printer, however, smoothness of paper is unavailable because of occurrence of print seams, but on the contrary, it is necessary to apply a pressure with a view to leveling the surface.

SUMMARY OF THE INVENTION

It is an object of the present invention to provide a transfer sheet of paper for electrophotography which solves the aforementioned problems and is suitably applicable particularly for color electrophotography.

More specifically, the present invention aims at ensuring a high paper feeding conveyability in a transfer material for electrophotography used in an electrophotographic device or an electrostatic recorder, and obtaining a surface smoothness sufficient to achieve a high image quality.

A second object of the invention is to provide a transfer sheet of paper which permits prevention of the above-mentioned problems even including occurrence of blisters by making contrivances in the coating method.

The present invention provides transfer paper for electrophotography having coated layers on both sides of a substrate material, comprising a first coated layer, containing a print seam, provided on at least one side thereof and a second coated layer provided on said first coated layer and having a print seam different from that of the first coated layer; wherein the total weight of the transfer paper for electrophotography is within a range from 60 to 130 g/m$^2$.

According to the present invention, the first coated layer and the second coated layer formed on at least one side of the substrate material have difference print seams. There are therefore available smooth coated layers, and a transfer sheet of paper for electrophotography having a high paper feeding conveyability with a weight from 60 to 130 g/m$^2$.

The manufacturing method of the transfer paper for electrophotography according to the present invention comprises a first coating step for coating a first coated layer having a print seam on at least one of the sides;

a drying step for drying the first coated layer formed in the first coating step; and a second coating step for coating a second coated layer having a print seam different from the first print seam, over the dried first coated layer;

wherein the transfer paper for electrophotography has a total weight within a range from 60 to 130 g/m$^2$.

According to the manufacturing method of the present invention, water contained in the substrate material is efficiently released through concave portions of the first coated layer (concavities of the print seams) during the drying step of the first coated layer, and this solves the problem of occurrence of blisters during image fixing when the paper is used as a transfer sheet of paper for electrophotography.

Further objects, features and advantages of the present invention will become apparent from the following description of the preferred embodiments with reference to the attached drawings.

DESCRIPTION OF THE PREFERRED EMBODIMENTS

Since the first and second coated layers formed on at least one side of the transfer sheet of paper according to the present invention have different print seams, convex/concave pattern of the coated ink of the first coated layer and convex/concave pattern of the coated ink of the second coated layer are not in complete alignment. As a result, convex/concave irregularities of the lamination of the first and second coated layers are reduced. It is therefore desirable to provide print seams different between the first and second coated layers so that concave portions of the convex/concave pattern of ink of the first coated layer correspond to convex portions of the convex/concave pattern of ink of the second coated layer in lamination. In the transfer paper for electrophotography, at least one coated layer should preferably contain a coating material resin.

Preferably, at least one coated layer should contain a pigment and a binder as main constituents.

It is desirable that the total coating weight of the coated layer on at least one side is within a range from 1 to 20 g/m$^2$.

At least one side should preferably have a surface roughness of 1.5 $\mu$m or less as an arithmetic mean (JIS B 0601).

Each of all the coated layers existing on both sides of the substrate material should preferably be coated under a coating pressure of 2.9 MPa or less.

Embodiments of the present invention will now be described with reference to the drawings.

The transfer sheet of paper according to the invention has coated layers on both sides of the substrate material. On at least one of the sides, a first coated layer having a print seam and a second coated layer having a print seam different from that of the first coated layer are formed in lamination.

Figure 1:
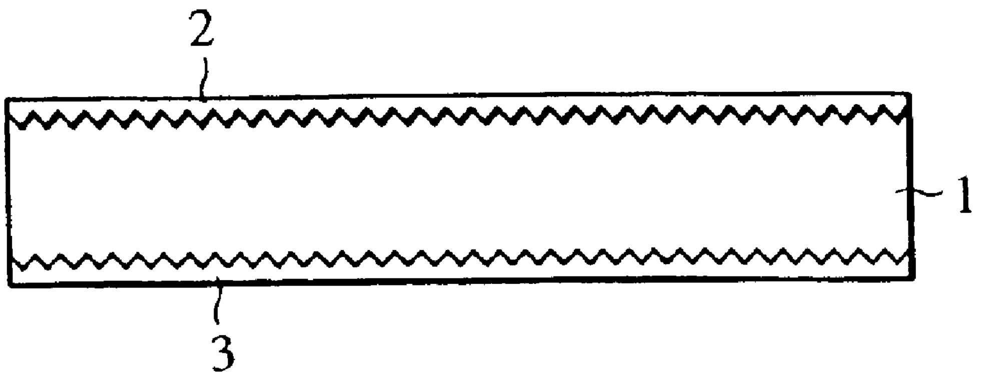
FIG. 1 is a sectional view schematically illustrating a typical configuration of the transfer paper for electrophotography of the present invention.

FIG. 1 is a schematic view illustrating a typical transfer sheet of paper according to the present invention. In FIG. 1, a transfer-side coated layer 2 is formed through lamination of the above-mentioned first and second coated layers. A back coated layer 3 suffices to comprise one or more coated layers. The present invention will be described by means of this configuration as an example. It is not necessary that the side having a particular two-layer structure as described above agrees with the transfer surface (the surface that will have a transferred image). That is, since this is a transfer sheet of paper, it has sat least one side serving as a transfer side. Irrespective of whether or not it is a transfer side, at least one side may have the above-mentioned particular two-layer structure. A transfer side suffices to have an appropriate smoothness sufficient to serve as a transfer paper.

The transfer paper of the present invention has a weight from 60 to 130 g/m$^2$. A weight smaller than 60 g/m$^2$ results in a low rigidity insufficient to permit paper feeding. A weight over 130 g/m$^2$ leads to an excessively high rigidity of paper even after application of a smoothing treatment, making it difficult to feed paper.

A kind of paper commonly applied as a substrate material for transfer paper such as wood-free paper, neutralized paper, rough paper and recycled paper is applicable as a substrate material 1. The paper used as the substrate material 1 should preferably have a volume intrinsic resistance of $1\times10^9\Omega$ or over, a paper manufactured without using a low-resistance agent such as a conducting agent is preferable.

The weight of the substrate material should preferably be within a range from 50 to 128 g/m$^2$.

The first coated layer and the second coated layer may contain a pigment and a binder, and may furthermore contain an adhesive with a view to improving fixability with toner to achieve a higher image quality after fixing. Upon coating these coated layers, a coating solution (hereinafter may be referred to as "ink" depending upon the case) containing a solvent as required in addition to the above-mentioned constituents may be employed.

Applicable pigments include mineral pigments such as heavy calcium carbonate, light calcium carbonate, titanium dioxide, aluminum hydroxide, satin white, talc, calcium sulfate, barium sulfate, zinc oxide, magnesium oxide, magnesium carbonate, amorphous silica, colloidal silica, white carbon, kaolin, baked kaolin, delaminated kaolin, aluminosilicate, cericite, and bentonite, polystyrene resin particles, urea-formaldehyde resin particles, micro-hollow particles and other organic pigments, as used singly or in combination.

As a binder, water-soluble adhesives which are generally used for coating and have a strong adhesivity with a substrate material or a pigment, on an emulsion and latex may be used singly or in combination of two or more thereof. Applicable binders include, for example, water-soluble resins such as polyvinylalcohol, denatured polyvinylalcohol, starch, gelatin, casein, methylcellulose, hydroxyethylcellulose, amide acrylate-ester acrylate copolymer, amide acrylate-acrylic resin-methacrylic acid ternary copolymer, styrene-acrylic resin, isobutylene-maleic anhydride resin, and carboxymethylcellulose, acryl-based emulsion, vinyl-acetate-based emulsion, vinylidene chloride emulsion, polyester-based emulsion, styrene-butadiene latex, acrylonitrile-butadiene latex, and acrylonitrile-butadiene latex.

Coating resins applicable for improving fixability with toner and for achieving a higher image quality after fixing include acrylic resins, alkyd resins, fluororesins, epoxy resins, phenol resins, urethane resins and polyurethane resins which are oily and aqueous and applicable for coating purposes, but are not limited to those enumerated above.

The coated layer which the transfer paper may have in addition to the first and second coated layers may contain the above-mentioned pigment and binder, may furthermore contain the above-mentioned adhesive for improving fixability with toner, but these additional constituents are not limitative.

The first and second coated layers should preferably have the same composition by, for example, forming these layers from the same coating solution. It is desirable that the other coated layers of the transfer paper have the same composition. Because both sides can have the same shrinkage ratio upon drying the coated layers, and curling can be easily prevented. In order to finally smooth the surface, the material should preferably have affinity with the other materials as a resin material.

The coating method for forming the first and second coated layers should produce a print seam. An embodiment of the manufacturing method of transfer paper will be described with reference to FIG. 3.

Figure 3A:
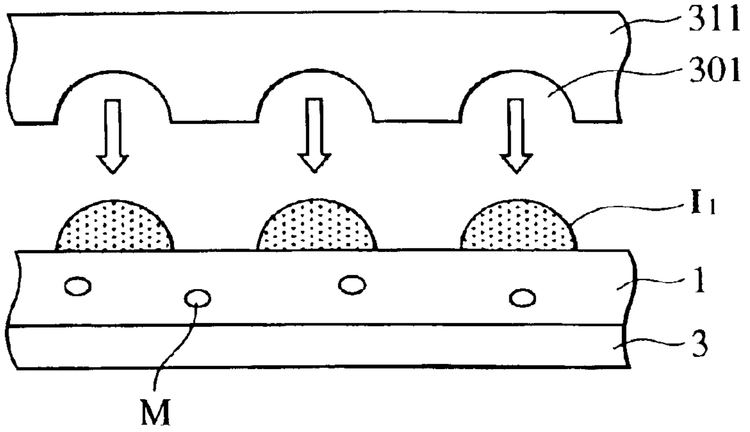
FIG. 3 is a schematic view illustrating difference in the state of coating of coated resins resulting from difference in print seams.

First, as shown in FIG. 3A, a coated layer is provided on one of the sides of the substrate material 1 (under-side in FIG. 3A). In this embodiment, the side opposite to that mentioned above (upper-side in FIG. 3A) serves as the transfer surface, and the thus formed coated layer is called the back-coated layer 3. Upon forming the back-coated layer, coating may be conducted from the back. For coating in this case, an ordinary coater may be employed. For example, blade coating, air knife coating, roll coating, curtain coating, or a coating method similar to that applied on the transfer surface side described below may be adopted.

Then, as shown in FIG. 3A, ink $I_1$ formed in a recess 301 of a first coating plate 311 is coated onto the side opposite to the above-mentioned side of the substrate material 1 of the transfer paper to form the first coated layers $I_1$. Since the first coated layers $I_1$ have gaps therebetween, the substrate material is exposed.

Figure 3B:
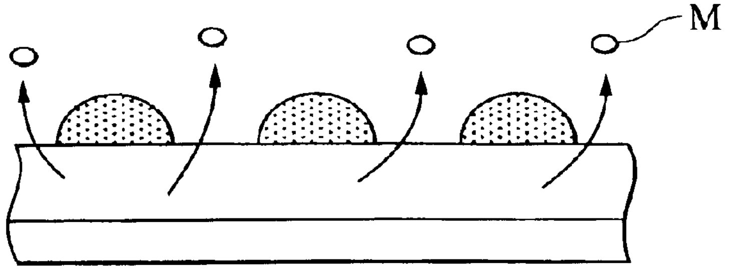

Then, the first coated layers $I_1$ are dried. As shown in FIG. 3B, water M contained in the substrate material is released outside through the gaps of the coating during the drying step.

Figure 3C:
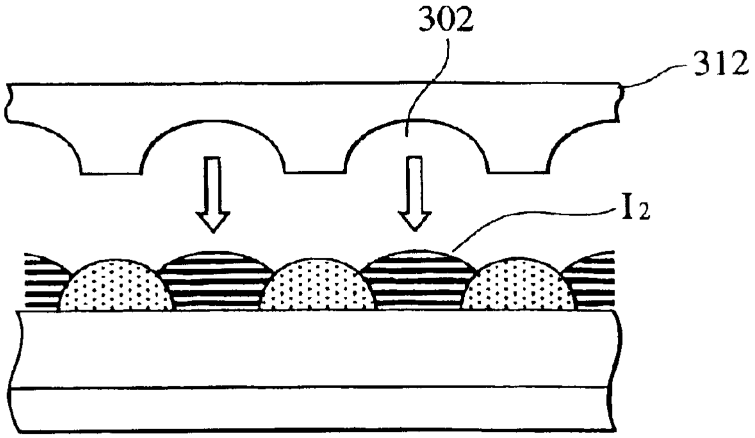

Immediately thereafter, as shown in FIG. 3C, ink $I_2$ is coated by means of a second coating plate 312 having a recess different from the recess 301. In this coating, the second coated layers $I_2$ have the gaps filled with the ink, and the exposed portions of the substrate material is covered.

Figure 3D:
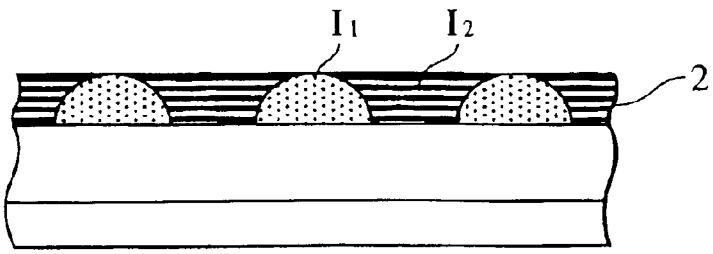

After drying of the second coated layer, smoothness of the surface is kept as shown in FIG. 3D, and moreover, water contained in the substrate material is eliminated, thus permitting prevention of blisters. The coater for forming a print seam should preferably be capable of ensuring spontaneous surface smoothing by the application of a usual printing process such as sheet-fed printing or offset printing including the gravure printing method, the screen printing method or the reverse roll coating method using gravure screen.

The first coated layer is dried until the water content in the substrate material becomes lower than 2 wt. % (the ratio of the water weight contained in the substrate material relative to the total weight of the substrate material), and from the point of view of preventing blisters, it is desirable to coat the second coated layer while the water content is kept under 2 wt. %.

The coating weight of the coated layer 2 on the transfer surface side should preferably be such that the total weight of all the coated layers existing on the transfer surface is within a range from 1 to 20 g/m$^2$. A weight under 1 g/m$^2$ is disadvantageous in that it tends to be difficult to form a high-quality image. With a weight of 20 g/m$^2$, the coated layer becomes too rigid to take balance by acting on the coating weight on the opposite surface to achieve a high image quality, and this is unfavorable in that the conveyability within the electrophotographic device tends to be poorer. For example, when each coated layer is formed into a weight over 20 g, the total weight of both sides exceeds 40 g. When manufacturing paper having a weight of 130 g on the maximum in this case, the weight of the substrate material would be under 90 g. If this transfer paper is finished without a smoothing treatment (a treatment reducing rigidity of paper), rigidity is increased on the contrary, and this is disadvantageous in that it tends to cause a poorer paper feed conveyability.

The coated layer 3 on the back should also preferably have such a weight that the total weight of all the coated layers existing on the back side is within a range from 1 to 20 g/m$^2$. It is furthermore desirable, from the point of view of preventing curling, that the total coating weight on a side is equal to that on the other side.

Coating producing a print seam may make it impossible to maintain smoothness of the surface. In the present invention, as described above, transfer paper permitting overcoming this risk and giving a high image quality is achieved by combining two print seams.

A surface having a surface roughness in arithmetic mean of 1.5 $\mu$m or under is preferable because of the possibility to form a high-quality image on such a surface.

In the present invention, excellent transfer paper is available without the need to carry out a calendar treatment after forming coated layers. With a view to preventing the rigidity from becoming lower, it is desirable that a pressurizing treatment such as a calendar treatment is not applied to any of the coated layers.

All the coated layers existing on both sides of the substrate material should preferably be coated under a coating pressure of 2.9 MPa or under. Under a coating pressure over this level, the coated layer is in a state to be deemed equivalent to one subjected to a calendar treatment. To prevent rigidity of the paper from becoming lower, as in the above-mentioned case, the coating pressure should preferably be 2.9 MPa or under.

Figure 2:
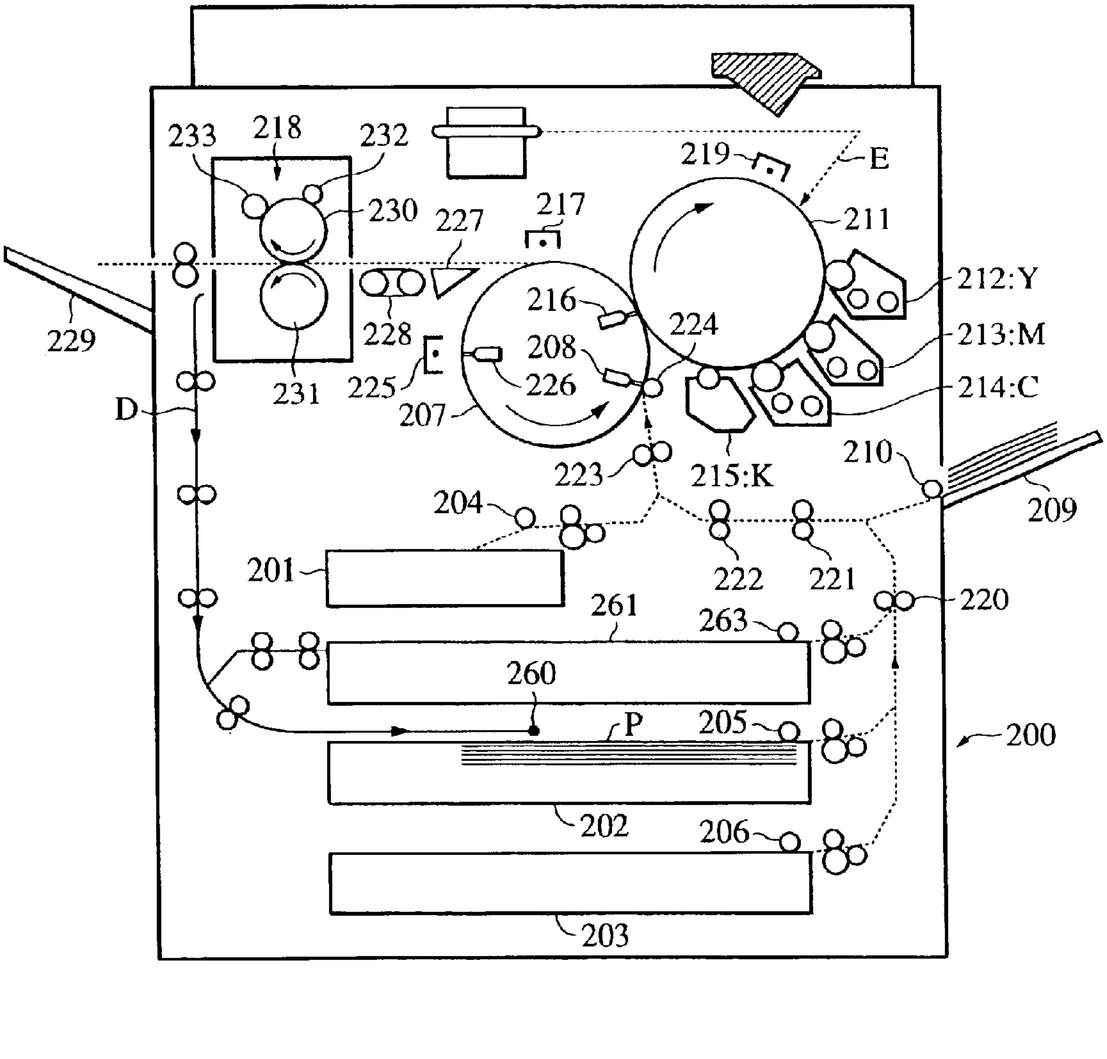
FIG. 2 is a schematic view illustrating a typical configuration of an electrophotographic device in which an image can be suitably formed by use of a transfer paper of the invention.

A typical multi-transfer electrophotographic device permitting suitable formation of an image by use of the transfer paper of the present invention is illustrated in FIG. 2. The device has, around a photosensitive drum 211, in sequence of image forming, a detachable yellow developer 212, a magenta developer 213, a cyan developer 214, and a black developed 215. The device furthermore has a rotatable transfer drum 207 for winding a transfer material around the peripheral surface thereof and sequentially and electrostatically transferring tone images from the photosensitive drum, a charging unit 219 necessary for forming as latent image, and an image exposure system E. When forming a full-color image in the electrophotographic device 200, a transfer material P pulled out from a paper feeding tray 202 or the like is taken out by means of a paper feeding roller 205 or the like in the arrow direction, conveyed through conveyance rollers 220, 221, 222 and 223 to the transfer drum 207, and wound on the transfer drum 207 by electrostatic suction by means of a suction brush 208. Multicolor transfer of toner images is carried out sequentially onto the transfer material P on the transfer drum 207 from the photosensitive drum 211 in accordance with the image forming procedure thereof. Transfer is performed with a transfer brush 216. More specifically, from in side the transfer drum 207 comprising a dielectric sheet of PBDF (polyvinylidene fluoride) or the like, a charge of a reverse polarity characteristic of the toner is imparted by the transfer brush 216 to the back of the transfer drum 207. The toner is attracted onto the transfer material surface on the dielectric sheet by means of an electric field produced by the imparted charge, thereby accomplishing transfer. By repeating this transfer a plurality of times for each of magenta (M), cyan (C), yellow (Y) and black (K) colors of toner, images of colors M, C, Y and K are formed on the transfer material. By causing this transfer material to pass through a heat fixing unit 218, these colors of toner are melt and mixed, thereby obtaining a full-color image.

A conveying system of the transfer material comprises transfer material feeding trays 201, 202 and 203 and a multi-feeding tray 209 arranged under the device main body 200; feeding rollers 204, 205 and 210 arranged directly above these trays 201, 202 and 203; conveying rollers 220, 221, 222 and 223 arranged closer to these feeding rollers 204, 205 and 206; a transfer roller 224, a separation charger 217 and a neutralizing charger 225 arranged sequentially from upstream in the rotating direction near the outer peripheral surface; a transfer drum 207 rotatable in the arrow direction in FIG. 2, having a suction brush 208, a transfer brush 216 and a neutralizing brush 226 arranged on the inner periphery side thereof; a separating claw 227 arranged near the transfer drum; conveyor belt means 228 arranged near the separating claw 227; and a heat fixing unit 218, arranged near a discharge tray 229, detachable to and from the device main body 200, arranged near the conveying direction terminal side of the conveyor belt means, and extending to outside the device main body 200.

The heat fixing unit 218 has a fixing roller 230 having a heater therein; a pressure roller 231 opposite to the fixing roller; a parting agent coating unit 232 for coating a parting agent such as silicone oil to the fixing roller; and cleaning means 233 for the fixing roller.

When copying on both sides, paper is conveyed in the direction D in FIG. 2, turned back at reversing pass 260, and conveyed to a two-side unit 261. The paper is fed by a feeding roller 263 similar to the feeding roller described above, and an image is formed on the back as in the above-mentioned image forming method.

EXAMPLES

The present invention will now be described further in detail by means of examples and comparative examples. The invention is not limited to these examples.

Example 1

Titanium oxide in an amount of 6 wt. % in dry weight standard, 6 wt. % kaolin, 0.5 wt. % aluminum sulfate, 0.3 wt. % rosin sizing agent, and 3.2 wt. % water-soluble binder were mixed to L.B.K.P. (broadleaf pulp). Papermaking was carried out in a long-mesh papermaking machine by use of a pulp suspension after adjustment with water, and the resultant paper was dried. A wood-free paper product of which the water contact was adjusted to 5% after paper-making was obtained.

A white pigment (calcium carbonate) in an amount of two weight parts was mixed to 150 weight parts coating acrylic resin for coating. A coating solution prepared by diluted with toluene was coated on a side of the wood-free paper with a gravure coater, thereby forming a coated layer on the back. The coated layer was dried to a weight of 8 g/m$^2$.

The above-mentioned coating solution was coated in an amount of 4.2 g/m$^2$ (coating weight after drying) on the surface not coated with the above-mentioned back coated layer by means of a gravure printer having 169/mm$^2$ 50 $\mu$m-diameter circular concavities on the surface, and then dried for two minutes at 100° C., thus forming a first coated layer. Immediately thereafter, the above-mentioned coating solution was coated in an amount of 3.8 g/m$^2$ (coating weight after drying) by means of a gravure printer having 169/mm$^2$ 50 $\mu$m-diameter circular concavities arranged on the surface so that convex portions of a second coated layer corresponded to concavities of the convex/concave irregularities pattern of the first coated layer. The second coated layer was dried for two minutes at 100° C. to form the second coated layer, thereby obtaining a transfer-side coated layer comprising a first coated layer and a second coated layer. The entire transfer sheet of paper had a weight of 110 g/m$^2$.

The transfer paper in this case had a surface roughness as represented by an arithmetic mean (Ra) of 1.1 $\mu$m, and a Clerk rigidity of 17 cm in the CD direction. This transfer paper was fed in the CD direction to a full-color copying machine (Model CLC-800) manufactured by Canon Kabushiki Kaisha. Image formability, paper-feed conveyability (fixability and twining), and blisters were confirmed.

As a result, a high-quality image as shown in Table 1 was obtained. Persistence in fixing or blisters did not occur.

The Clerk rigidity in CD direction means a value measured by the JIS-P-8143A method as follows. When pinching an end of a long and slender shape test piece of which the shorter side is perpendicular (cross direction) to the papermaking direction and the longer side is in parallel with the papermaking direction and supporting the test piece upward, and when the direction of the hanging leading end of the test piece is reversed by turning the test piece by 90° around the pinching line, the length between the pinching point and the leading end of the test piece is the value of rigidity.

Example 2

Transfer paper having a total weight of 108 g/m$^2$ was manufactured in the same manner as in Example 1 except that, upon forming a transfer surface side coated layers, a silk screen printer having 80/mm$^2$ 75 $\mu$m×75 $\mu$m square openings was used in place of the gravure printer; the coating weight of a first coated layer was changed to 2.5 g/m$^2$ (coating weight after drying); a second coated layer having a different print seam was formed on the silk screen printer having 80/mm$^2$ 75 $\mu$m×75 $\mu$m square openings arranged on the surface so that the concavity of a convex/concave pattern of the first coated layer was aligned with the convex portion of the second coated layer; and the coating weight of the second coated layer was changed to 3.5 g/m$^2$ (coating weight after drying).

The resultant transfer paper had a CD-direction Clerk rigidity of 16 cm, and an arithmetic mean roughness (Ra) of 1.2 $\mu$m.

As a result of evaluation of this transfer paper in the same manner as in Example 1, a high-quality image as shown in Table 1 was obtained without occurrence of fixing-twining or blisters.

Example 3

Transfer paper was manufactured in the same manner as in Example 1 except that 150 weight parts coating urethane resin and 10 weight parts white pigment were used in place of 150 weight parts coating acrylic resin and 2 weight parts white pigment. The resultant transfer paper had a CD-direction Clerk rigidity of 17.4 cm, and an arithmetic mean roughness (Ra) of 1.25 $\mu$m.

An evaluation as in Example 1 was applied to this transfer paper. As a result, a high-quality image as shown in Table 1 was obtained without occurrence of fixing-twining or blisters.

Comparative Example 1

Transfer paper was manufactured in the same manner as in Example 1 except that a roll coater was employed for forming a coated layer on the transfer surface side; only one coated layer having no print seam of a weight of 8 g/m$^2$ (coating weight after drying) was coated; and a calendar treatment was applied. The resultant transfer paper had a paper rigidity (CD-direction Clerk rigidity) of 14.7 cm, and an arithmetic mean roughness (Ra) of 0.5 $\mu$m.

An evaluation as in Example 1 was applied to this transfer paper. While the image was satisfactory, fixing-twining and blisters were produced.

Comparative Example 2

Transfer paper was manufactured in the same manner as in Example 1 except that a second coated layer was coated without changing seams of gravure printing. The resultant transfer paper had a rigidity (CD-direction Clerk rigidity) of 17 cm and an arithmetic mean roughness (Ra) of 2.5 $\mu$m.

An evaluation as in Example 1 was applied to this transfer paper. While the transfer paper showed no fixing-twining or blisters, the surface had irregularities, and had a poor exterior view without the natural feeling of the image unique to coated paper.

Comparative Example 3

Transfer paper was manufactured in the same manner as in Example 1 except that wood-free paper was made with a small weight, and a back-side coated layer or a transfer-side coated layer was not provided. The resultant transfer paper in this case had a CD-direction Clerk rigidity of 14 cm and an arithmetic mean roughness (Ra) of 1.7 $\mu$m. Although no blister was produced, there occurred fixing-twining, and the image did not show favorable features intrinsic to coated paper.

TABLE 1

| | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 |
|---|---|---|---|---|---|---|
| TOTAL WEIGHT OF TRANSFER PAPER (g/m$^2$) | 110 | 108 | 110 | 110 | 110 | 75 |
| BINDER | ACRYLIC RESIN | ACRYLIC RESIN | URETHANE RESIN | ACRYLIC RESIN | ACRYLIC RESIN | NONE |
| COATING METHOD OF COATED LAYER ON TRANSFER SURFACE SIDE | GRAVURE PRINTING | SILK SCREEN | GRAVURE PRINTING | ROLL COATER | GRAVURE PRINTING | NONE |
| CALENDAR TREATMENT OF COATED LAYER ON TRANSFER SURFACE SIDE | NONE | NONE | NONE | APPLIED | NONE | NONE |
| WEIGHT OF FIRST COATED LAYER (g/m$^2$) | 4.2 | 2.5 | 4.2 | 8 (NO PRINT SEAM) | 4.2 | NONE |
| WEIGHT OF SECOND COATED LAYER (g/m$^2$) | 3.8 | 3.5 | 3.8 | NONE | 3.8 | NONE |
| CD DIRECTION CLARK RIGIDITY (cm) | 17 | 16 | 17.4 | 14.7 | 17 | 14 |
| ROUGHNESS ($\mu$m) | 1.1 | 1.2 | 1.25 | 0.5 | 2.5 | 1.7 |
| IMAGE FORMABILITY | ○ | 602 | ○ | ○ | x | x |
| FIXING/WINDING | ○ | ○ | ○ | x | ○ | x |
| BLISTER | ○ | ○ | ○ | x | ○ | ○ |

○: EXCELLENT; x: POOR (DEFECT PRODUCED OR SHEET CANNOT BE FED)

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Transfer paper for electrophotography having coated layers on both sides of a substrate material, wherein at least one of said coated layers comprises a plurality of first coated layers, containing a gap between each of said plurality of first coated layers, provided on at least a side thereof; and a plurality of second coated layers, each provided adjacent to at least one of said plurality of first coated layers, said plurality of second coated layers filling the gap between each of said plurality of first coated layers, wherein the total weight of the transfer paper for electrophotography is within a range from 60 to 130 $g/m^2$.

2. Transfer paper for electrophotography according to claim 1, wherein at least one of the coated layers contains a resin.

3. Transfer paper for electrophotography according to claim 1, wherein at least one of the coated layers contains a pigment and a binder as main constituents.

4. Transfer paper for electrophotography according to any one of claims 1 to 3, wherein the coated layers on at least one of the sides have a total weight within a range from 1 to 20 $g/m^2$.

5. Transfer paper for electrophotography according to claim 1, wherein at least one of the sides has a surface roughness of 1.5 $\mu$m or less as an arithmetic mean.

6. Transfer paper for electrophotography according to claim 1, wherein each of all the coated layers existing on both sides of the substrate material is coated under a coating pressure of 2.9 MPa or less.

* * * * *

UNITED STATES PATENT AND TRADEMARK OFFICE

CERTIFICATE OF CORRECTION

PATENT NO. : 6,911,250 B2

DATED : June 28, 2005

INVENTOR(S) : Motohiro Ogura

It is certified that error appears in the above-identified patent and that said Letters Patent is hereby corrected as shown below:

Column 7,
Line 4, “in side” should read -- inside --.
Line 17, “melt” should read -- melted --.

Column 9,
Line 61, “602” should read -- 0 --.

Signed and Sealed this

First Day of November, 2005

JON W. DUDAS
*Director of the United States Patent and Trademark Office*